US012679174B2

(12) United States Patent
Mahakali et al.

(10) Patent No.: US 12,679,174 B2
(45) Date of Patent: Jul. 14, 2026

(54) METHOD AND SYSTEM FOR CONTROLLING A RETRACTABLE BELLYPAN OF A VEHICLE TO IMPROVE HVAC AND ENGINE COOLING PERFORMANCE

(71) Applicant: FCA US LLC, Auburn Hills, MI (US)

(72) Inventors: Uday Kiran Mahakali, Novi, MI (US); Sreekanth Surapaneni, Oakland, MI (US)

(73) Assignee: FCA US LLC, Auburn Hills, MI (US)

( * ) Notice: Subject to any disclaimer, the term of this patent is extended or adjusted under 35 U.S.C. 154(b) by 359 days.

(21) Appl. No.: 18/494,303

(22) Filed: Oct. 25, 2023

(65) Prior Publication Data

US 2025/0135840 A1     May 1, 2025

(51) Int. Cl.
*B60H 1/32*        (2006.01)
*B62D 25/08*       (2006.01)

(52) U.S. Cl.
CPC .............. *B60H 1/32* (2013.01); *B62D 25/082* (2013.01); *B60H 2001/3276* (2013.01)

(58) Field of Classification Search
CPC .............. B60H 1/32; B60H 2001/3276; B60H 2001/3258; B60H 2001/3266; B60H 2001/3277; B60H 1/3211; B62D 25/082; B60K 11/08
See application file for complete search history.

(56) References Cited

U.S. PATENT DOCUMENTS

| | | | | |
|---|---|---|---|---|
| 9,770,973 B1 * | 9/2017 | Vaddiraju | ............ | B62D 25/082 |
| 2007/0113571 A1 * | 5/2007 | Park | ....................... | B60H 1/004 |
| | | | | 62/235.1 |

| | | | | |
|---|---|---|---|---|
| 2011/0048673 A1 * | 3/2011 | Kim | ................... | B60H 1/00028 |
| | | | | 165/61 |
| 2012/0024611 A1 * | 2/2012 | Ajisaka | .................. | B60K 11/08 |
| | | | | 180/68.1 |
| 2012/0153681 A1 * | 6/2012 | Ajisaka | .................. | B60K 11/08 |
| | | | | 296/208 |
| 2013/0146248 A1 * | 6/2013 | Kim | ................... | B60H 1/00028 |
| | | | | 454/162 |
| 2017/0326939 A1 * | 11/2017 | Hiraoka | ................ | E02F 9/0858 |
| 2018/0201088 A1 * | 7/2018 | Nomura | ................... | F24F 11/89 |
| 2018/0290535 A1 * | 10/2018 | McMillan | ............. | B60K 11/08 |
| 2020/0369108 A1 * | 11/2020 | Kim | ................... | B60H 1/32284 |
| 2022/0088995 A1 * | 3/2022 | Kim | ................... | B60H 1/00278 |
| 2023/0182532 A1 * | 6/2023 | Park | .................. | B60H 1/00392 |
| | | | | 62/228.4 |
| 2025/0187392 A1 * | 6/2025 | Chen | .................. | H01M 10/613 |

FOREIGN PATENT DOCUMENTS

| | | | | | |
|---|---|---|---|---|---|
| KR | 20120126761 A | * | 11/2012 | ............. | F04B 27/14 |
| WO | WO-2018230484 A1 | * | 12/2018 | ............. | F16D 48/06 |

OTHER PUBLICATIONS

Machine translation of KR20120126761 (Year: 2012).*
Machine translation of WO2018230484 (Year: 2018).*

* cited by examiner

*Primary Examiner* — Anne Marie Antonucci
*Assistant Examiner* — Patrick Daniel Mohl
(74) *Attorney, Agent, or Firm* — Jeremy J. Klobucar

(57)     ABSTRACT

A method of controlling a vehicle having a retractable bellypan and a heating, ventilation and air conditioning (HVAC) system determining a condenser temperature of a condenser of the HVAC system, comparing the condenser temperature to a temperature threshold and controlling a bellypan opening in response to comparing.

20 Claims, 4 Drawing Sheets

METHOD AND SYSTEM FOR CONTROLLING A RETRACTABLE BELLYPAN OF A VEHICLE TO IMPROVE HVAC AND ENGINE COOLING PERFORMANCE

FIELD

The present disclosure relates to a heating, ventilation and air conditioning (HVAC) system of a vehicle, and, more specifically, to controlling a retractable bellypan of a vehicle to improve HVAC and Engine Cooling system performance.

BACKGROUND

This section provides background information related to the present disclosure which is not necessarily prior art.

Heating ventilation and air conditioning (HVAC) systems are used to control the cabin air temperature within a vehicle so that occupants remain comfortable. An HVAC system provides an evaporator, compressor, condenser and refrigerant that fluidically connects the evaporator and condenser. The condenser is a heat exchanger that is used to reject heat from the HVAC system to external air flowing through front of the vehicle. The vehicle cooling system also includes a fan that pushes the air through the condenser. The rejection of the required amount of heat by the condenser is an important factor in the functioning of the HVAC system. In vehicles with conventional engines (gasoline or diesel), the engine cooling system includes a heat exchanger, typically called radiator which is used to reject heat from coolant passing through in-cylinder passages to external air flowing through front of the vehicle.

The front of the vehicle also includes a bellypan that covers the underbody components at the front of the vehicle. The bellypan protects the components in the front of the vehicle from the exterior environment as well as providing improved vehicle aerodynamics.

The rejection of heat depends on the temperature and mass flow rate of the ambient air entering the inlet face of the condenser and radiator. The colder the air entering the condenser or radiator inlet face, the higher the rejection of heat through the condenser. Similarly, the greater the mass flow rate of ambient air entering the condenser or radiator face, the higher is the heat rejection through these. As mentioned above, the fan draws cold ambient air into the heat exchangers and carries away the heat from the condenser and radiator system. Because of the bellypan and the vehicle configurations, hot air exiting from the underbody of the vehicle is recirculated and causes the HVAC and engine cooling system to operate in a less efficient manner. The average air temperature at the inlet of the condenser therefore increases which results in the loss of the heat carrying capacity of the system. Known solutions include lowering the ride height of the vehicle, closing the wheel liner gaps to prevent or reduce high air exit through the wheel liners and optimizing the fan to run at higher speeds. However, some vehicles are not be capable of lowering the ride height. Air tightness is very hard to achieve due to noise vibration and harness/assembly/manufacturing tolerances concerns. Running the fan at high speed also increases energy consumption and noise.

SUMMARY

This section provides a general summary of the disclosure, and is not a comprehensive disclosure of its full scope or all of its features.

In the present example, a bellypan with a mechanism to retract at least a portion of the bellypan is used to selectively operate and therefore allow for hot air to exit and therefore increase the efficiency of the HVAC and engine cooling system of the vehicle. Opening the bellypan helps to depressurize underhood of the vehicle thereby allowing more cold air through the front of the vehicle. The present disclosure improves cooling airflow to heat exchangers during high vehicle power demand situations like trailer towing, hill climbing and the like by opening the bellypan thereby de-pressurizing the underhood which then allows for higher ram air flow.

In one aspect of the disclosure, a method of controlling a vehicle having a retractable bellypan and a heating, ventilation and air conditioning (HVAC) system includes determining a condenser temperature of a condenser of the HVAC system, comparing the condenser temperature to a temperature threshold and controlling a bellypan opening in response to comparing.

In a further aspect of the disclosure, system for a vehicle includes a retractable bellypan, a heating, ventilation and air conditioning (HVAC) system comprising a condenser temperature of a condenser of the HVAC system, a condenser temperature sensor generating a temperature sensor signal and a controller. The controller is programmed to compare the condenser temperature to a temperature threshold; and control a bellypan opening in response to comparing.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Example embodiments will now be described more fully with reference to the accompanying drawings.

Figures 1A, 1B:
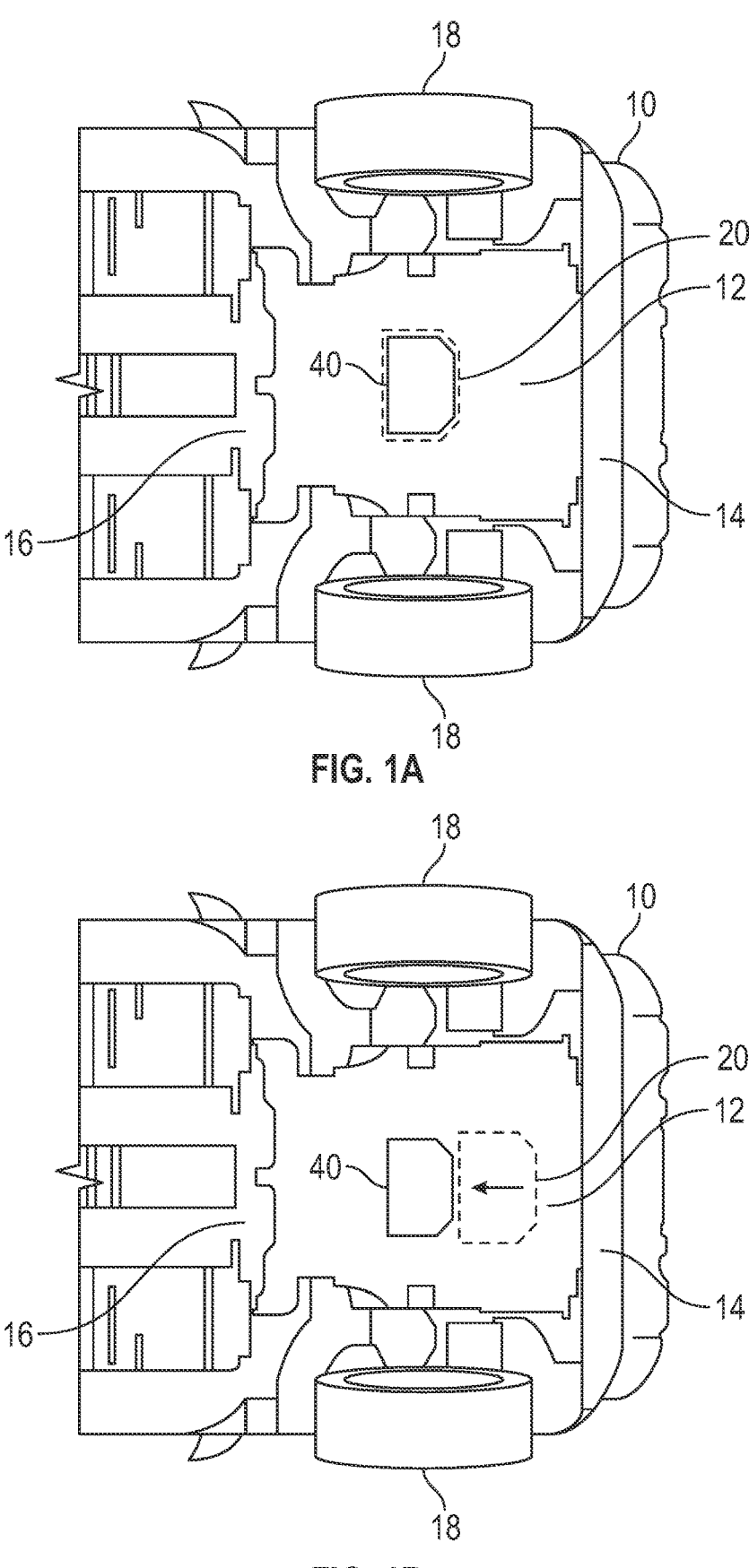
FIG. 1A is a bottom view of a vehicle having a closed bellypan.
FIG. 1B is a bottom view of the vehicle with the bellypan in an opened position.

Referring now to FIG. 1A, a front portion of a vehicle 10 is illustrated. The vehicle 10 includes a bellypan 12. The bellypan 12 is formed of various materials such as composite material. The bellypan 12, in this example, extends from a front bumper 14 to the load floor 16. In this example, the bellypan 12 extends from in front of the front wheels 18 to behind the front wheels 18. The bellypan 12 has a movable or retractable element 20.

Referring now to FIG. 1B, the retractable element 20 is shown in the retracted position to allow air to flow through the opening 40 in the bellypan 12 of the vehicle 10.

Figure 2A:
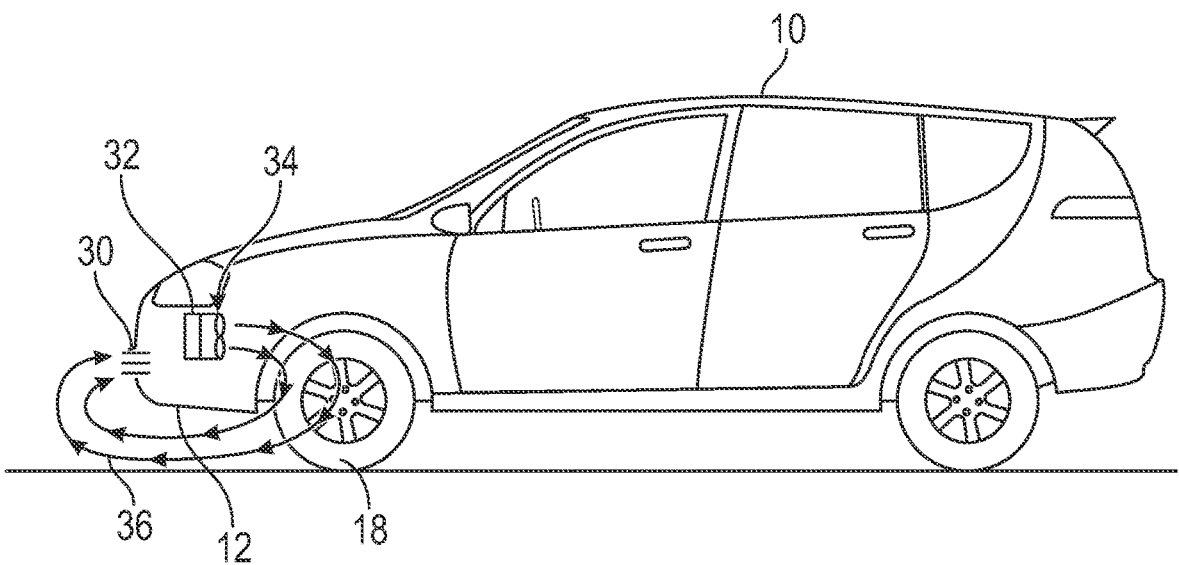
FIG. 2A is aide cross-sectional view of a vehicle having the bellypan closed.

Referring now to FIG. 2A, a vehicle 10 is illustrated having openings 30 in the front of the vehicle 10 such as through the bumper of front fascia. The vehicle 10 has a condenser 32 and a fan 34 associated with a condenser 32 to allow circulation. In FIG. 2A, the circulating air 36 with the bellypan 12, in a closed position, shows the hot air recirculating and re-entering the area by the condenser 32. This is disadvantageous when the HVAC system of the vehicle requires further cooling. The HVAC system includes but is not limited to the user interface associated with the system, the blower fans, the under hood fan, the condenser and the evaporator.

Figure 2B:
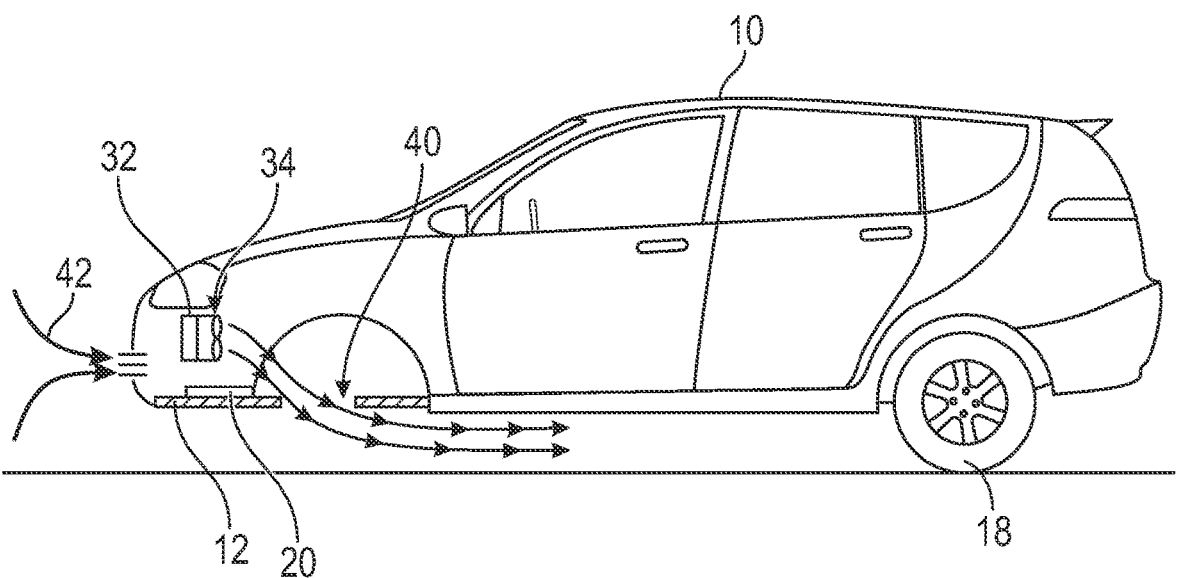
FIG. 2B is side cross-sectional view of the vehicle having the bellypan retracted.

Referring now to FIG. 2B, the vehicle 10 is illustrated having a bellypan 12 with a retractable element 20. The retractable element 20 is illustrated in a retracted or open position to allow an opening 40. Cold air 42 from the front of the vehicle is drawn into the vehicle 10 through the condenser 32 by the fan 34 and out the opening 40 toward the rear of vehicle 10. This prevents recirculating hot air into and around the condenser 32.

Figure 3:
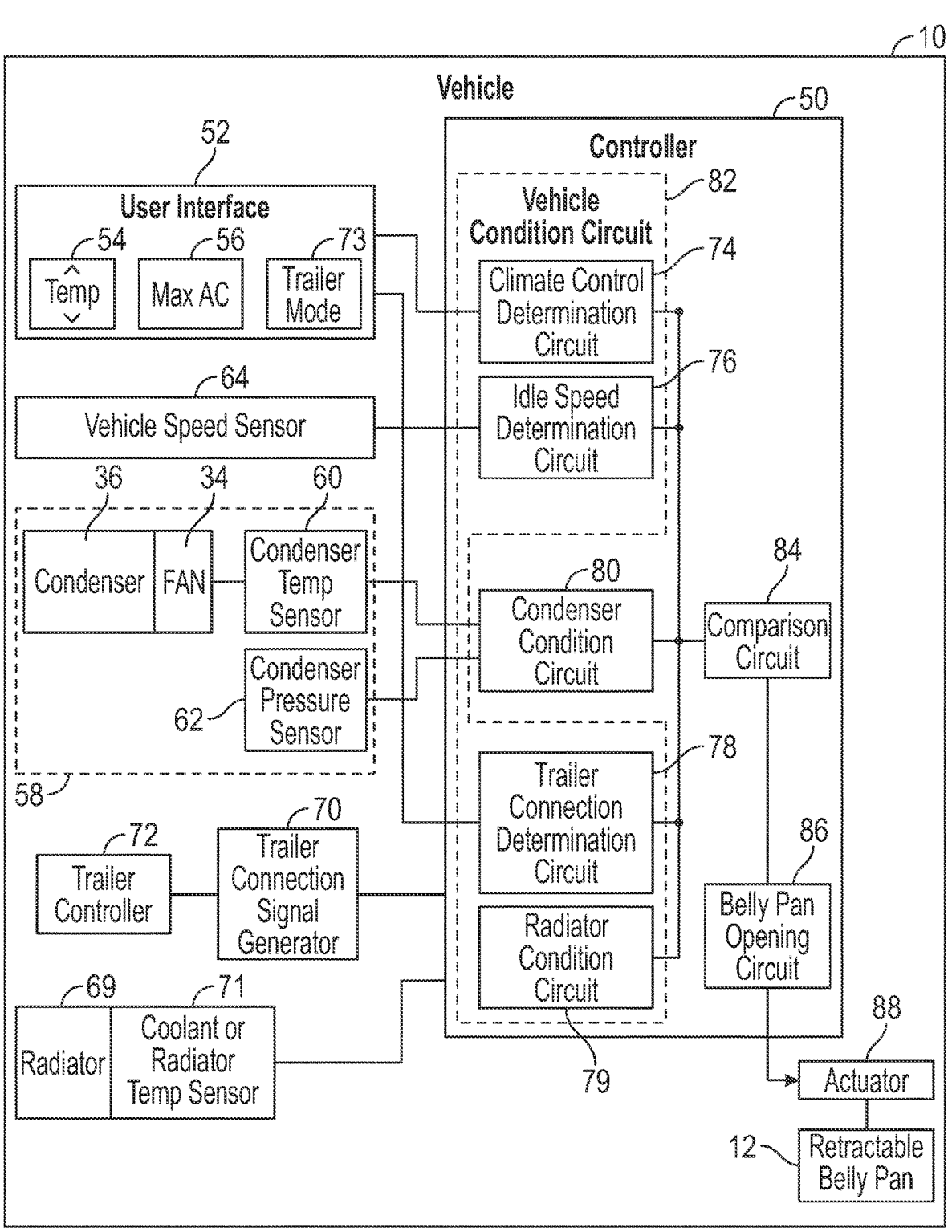
FIG. 3 is block diagrammatic view of the control system for controlling the opening of the bellypan.

Referring now to FIG. 3, a block diagrammatic view of the vehicle 10 having a controller 50 is set forth. The controller 50, in this example, is microprocessor-based and is programmed to perform various functions. The controller 50 is illustrated as one controller. In many vehicles, however, a number of controllers is used in a coordinated manner to control various functions.

The controller 50 is in communication with a user interface 52. The user interface 52 is simplified in this example. The user interface 52 is a button or switch within the vehicle. The user interface 52 has, in one example, buttons displayed on a touch screen. The user interface 52 includes a temperature button 54 and a maximum air conditioning button 56. The temperature button 54 is used to select the desired temperature within the cabin of the vehicle. Many zones is provided within a vehicle and therefore many temperature buttons 54 is provided within the vehicle so that individual occupants can control the climate around their seating position. The maximum air conditioning button 56 is used when the vehicle is desired to maximum the cooling from the heating ventilation and air conditioning system 58. As mentioned above, the heating ventilation and air conditioning system (HVAC) 58 includes the condenser 36, at least a portion of the user interface 52 and the fan 34. The evaporator of the HVAC system 58 is not illustrated. The HVAC system 58 also includes one or more sensors to determine a condition of the condenser 36. The condition is temperature or pressure of the condenser in this example. A condenser temperature sensor 60 and a condenser pressure sensor 62 are illustrated as condenser condition sensors in this example. The condenser temperature sensor 60 is a discrete sensor located in various locations relative to the condenser 36. For example, the condenser temperature sensor 60 is located on the exterior of the condenser 36 to generate a temperature surface temperature signal corresponding to the surface temperature of the condenser 36. The condenser temperature sensor 60 is also be located in the fluid path that circulates fluid within the condenser. In all situations, the condenser temperature sensor 60 provides a temperature signal that corresponds to the fluid temperature within the condenser 36. The condenser pressure sensor 62 generates a condenser pressure signal corresponding to the pressure within the condenser 36.

The vehicle 10 has a vehicle speed sensor 64. The vehicle speed sensor 64 generates a signal that corresponds to the vehicle speed. Individual sensors is located at the wheels of the vehicle and, by way of a calculation, generates a vehicle speed sensor. Vehicle speed signals and the generation thereof are well known in the automotive industry.

A trailer connection signal generator 70 generates a trailering signal that corresponds to whether a trailer is connected. The trailer connection signal generator 70 generates a signal that corresponds to the connection of a trailer to the vehicle 10. The trailer is sensed by a sensor or by the trailer connector being connected to the vehicle. That is, the electrical connector associated with the trailer is connected to a connector on the vehicle so that brake lights and operating lights are controlled by the vehicle. A trailer controller 72 is activated when the trailer connector is coupled to the vehicle connector by sensing, for example, current through an electrical wire. Of course, other types of trailer connectors is provided including a trailer mode sensor button 73 that is part of the user interface 52. The trailer connection is therefore detectable in many ways. The controller 50 is coupled to the user interface 52 and receives signals corresponding to the various buttons, dials or the like that part of the user interface. The user interface 52 is in communication with a climate control determination circuit 74 of the controller 50. The climate control determination circuit 74 receives the signals from the user interface and determines, for example, the setting of the climate control system. The settings includes the maximum air conditioning signal from the maximum air conditioning button 56 or the temperature control button 54. One example of the temperature control 54 allowing a setting that is a maximum high setting or a maximum low setting by arrowing up or down at the button 54.

A coolant or radiator temperature sensor 71 generates a coolant temperature signal of the coolant within the vehicle radiator 69. A coolant or radiator condition circuit 79 determines the vehicle is under load based on the coolant temperature. When the vehicle is under load the bellypan 12 opens to allow faster cooling of the radiator 69.

The controller 50 has an idle speed determination circuit 76. The idle speed determination circuit 76 is in communication with the vehicle speed sensor 64 and receives the vehicle speed signal that corresponds to the signal of the vehicle speed. When the vehicle speed is low, the idle speed determination circuit determines that the vehicle is at idle by generating an idle speed signal. The idle speed determination circuit 76 also indicates idle speed when the vehicle speed is not only zero but at idle when an idle speed threshold is set. For example, the idle speed determination circuit 76 determines an idle speed when the vehicle speed is below 10 mph or 5 mph.

A trailer connection determination circuit 78 receives a trailer connection signal from the trailer connection signal generation 70. As illustrated in the present example, a trailer mode button 73 is also be selected and communicates a trailer signal to the trailer connection signal generator 70 or directly to the trailer connection determination circuit as illustrated.

The controller 50 also includes a condenser condition circuit 80. The condenser condition circuit 80 receives the condenser condition sensor signals from the condenser temperature sensor 60 or the condenser pressure sensor 62 (or both) to allow control based or the temperature pressure or both.

The climate control determination circuit 74, the idle speed determination circuit 76, the trailer connection determination circuit 78 the radiator condition circuit 79 are part of a vehicle condition circuit 82.

A comparison circuit 84 is used when a vehicle condition is met. The comparison circuit 84 determines the temperature or pressure of the condenser from the condenser condition circuit 80 and compares it to a threshold. When the temperature or pressure is above the threshold or the coolant or radiator temperature is above a threshold, the comparison circuit 84 generates a control signal and communicates the control signal to a bellypan opening circuit 86. The bellypan opening circuit 86 generates a control signal that is communicated to the actuator 88 which opens the opening in the retractable bellypan 12. The retractable bellypan 12 has louvers, a door or various other types of means that are used to open an opening and close an opening and therefore retract.

Figure 4:
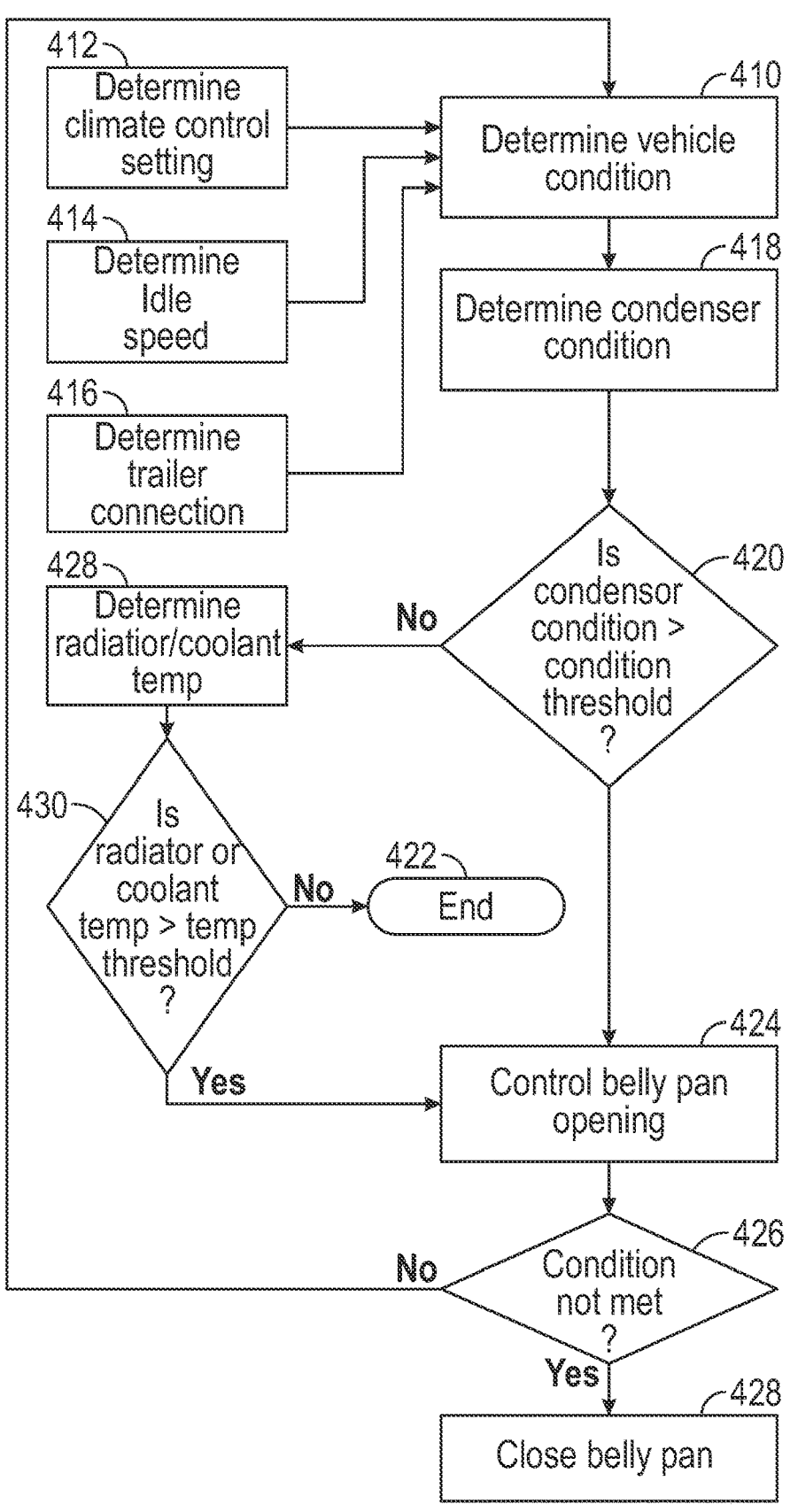
FIG. 4 is a flowchart of a method for controlling the opening of the bellypan.

Referring now to FIG. 4, a method for controlling the bellypan opening is set forth. In step 410, various vehicle conditions are present in order to control the bellypan opening. That is, when various one or more of the conditions are generated and the condenser temperature is above a threshold, the control system controls the opening of the bellypan. In this example, a climate control setting is determined in step 412. That is, the climate control setting have a low or minimum temperature set by the user interface button 54 or a maximum air conditioning button 56. In step 414, the idle speed is determined. When the vehicle is at a speed that corresponds to idle (0 or, as mentioned above, below a low speed threshold such or 5 mph or 10 mph), the vehicle condition is met in step 410. In step 416, the system determines whether a trailer is connected. The trailer being connected is one of the vehicle conditions determined in the step 410 of determining a vehicle condition. Once one or more of the vehicle conditions are met, step 418 determines the condenser condition such as a temperature or pressure. As mentioned above, a sensor located inside the condenser or external to the condenser determines the condenser temperature or pressure. The condenser condition of step 418 therefore corresponds to the temperature or pressure of the fluid within the condenser prior to being circulated back to the evaporator When the condenser temperature is greater than the temperature threshold, the bellypan is controlled to be open in step 424. That is, the bellypan is controlled by an actuator signal to open an opening within the bellypan of the vehicle. In step 420, when the condenser condition is not greater than a temperature or pressure (condition) threshold, the system checks the radiator or coolant temperature in step 428. When the radiator or coolant temperature is greater than a coolant temperature threshold in step 430, step 426 is performed. When the temperature of the coolant or radiator is not greater than the threshold, the system ends in step 422. After step 424, step 426 is also performed. In step 426, it is determined whether one of the conditions is not met. The condition in step 426 corresponds to those in steps 412-416 as well as whether the condenser temperature is above a threshold. When all of the conditions are not met, the system returns to step 410. In step 426, when vehicle conditions are not met, the bellypan is closed in step 428.

Example embodiments are provided so that this disclosure will be thorough and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A method of controlling a vehicle having a retractable bellypan and a heating, ventilation and air conditioning (HVAC) system comprising:

determining a condenser condition of a condenser of the HVAC system or an engine coolant temperature;

comparing the condenser condition to a condition threshold or the engine coolant temperature to a coolant threshold; and controlling a retractable element of a bellypan opening from an open position allowing airflow through the bellypan opening to a closed position preventing airflow through the bellypan opening in response to the comparing.

2. The method of claim 1 wherein determining the condenser condition comprises determining a condenser temperature or a condenser pressure.

3. The method of claim 2 wherein controlling the bellypan comprises controlling the retractable element to open the bellypan opening when the condenser temperature is greater than a temperature threshold.

4. The method of claim 2 wherein determining the condenser temperature comprises determining the condenser temperature with a condenser fluid temperature sensor.

5. The method of claim 1 wherein the controlling the bellypan opening comprises controlling the bellypan opening based on a climate control setting and a condenser temperature.

6. The method of claim 5 further comprising selecting the climate control setting from a user interface.

7. The method of claim 1 further comprising generating an idle signal when the vehicle is idling based on a vehicle speed signal.

8. The method of claim 1 wherein the controlling the bellypan comprises controlling the bellypan based on an idle signal.

9. The method of claim 8 further comprising determining the idle signal based on a vehicle speed.

10. The method of claim 1 further comprising generating a trailering signal when the vehicle has a trailer coupled thereto and wherein the controlling the bellypan opening comprises controlling the bellypan opening based on the trailering signal.

11. The method of claim 10 wherein generating the trailering signal from a trailer connector.

12. The method of claim 1 wherein controlling the bellypan opening comprises closing the bellypan opening when the vehicle is above idle.

13. A system for a vehicle comprising a bellypan having a retractable element;

a heating, ventilation and air conditioning (HVAC) system comprising a condenser temperature of a condenser of the HVAC system;

a condenser temperature sensor generating a temperature sensor signal; and a controller programmed to compare the condenser temperature to a temperature threshold; and control the retractable element of a bellypan opening from an open position allowing airflow through the bellypan opening to a closed position preventing airflow through the bellypan opening in response to comparing.

14. The system of claim 13 wherein the condenser temperature comprises a condenser surface temperature.

15. The system of claim 13 wherein the condenser temperature comprises a condenser fluid temperature.

16. The system of claim 13 wherein the controller is programmed to control the bellypan based on a climate control setting and the condenser temperature.

17. The system of claim 13 wherein the controller is programmed to control the bellypan based on an idle signal.

18. The system of claim 17 wherein the controller determines the idle signal based on a vehicle speed signal.

19. The system of claim 13 wherein the controller determines a trailering signal when the vehicle has a trailer coupled thereto and wherein the controller is programmed to control the bellypan opening based on the trailering signal.

20. The system of claim 13 wherein the controller is programmed to control the opening of the bellypan using a bellypan actuator.

* * * * *